United States Patent
Tutt et al.

(10) Patent No.: US 6,846,776 B2
(45) Date of Patent: Jan. 25, 2005

(54) TRANSFER LAMINATE DONOR FOR LENTICULAR IMAGES WITH ANTI-STICK BACKING MATERIAL

(75) Inventors: Lee W. Tutt, Webster, NY (US); Jason E. Anderson, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 187 days.

(21) Appl. No.: 10/224,872

(22) Filed: Aug. 21, 2002

(65) Prior Publication Data

US 2004/0038822 A1 Feb. 26, 2004

(51) Int. Cl.⁷ .......................... B41M 5/035; B41M 5/38
(52) U.S. Cl. ..................... 503/227; 428/32.51
(58) Field of Search ...................... 428/32.51; 503/227

(56) References Cited

U.S. PATENT DOCUMENTS 5,576,264 A * 11/1996 Ueno et al. ............... 503/227
5,821,028 A * 10/1998 Maejima et al. ........... 430/201
6,239,068 B1   5/2001 Tutt et al. .................. 503/201

* cited by examiner

Primary Examiner—Bruce H. Hess
(74) Attorney, Agent, or Firm—Kathleen Neuner Manne; Arthur E. Kluegel

(57) ABSTRACT

Disclosed is a multilayer transfer laminate donor comprising a flexible support bearing on the top side of the support:
  a) a release layer capable of allowing the support to be removed from all layers above the release layer;
  b) above the release layer a dye receiving layer;
  c) on top of the transfer laminate donor, a thermal adhesion layer comprising a polymer which has a Tg less than 100° C., and that, upon application of heat, is capable of adhering to a lenticular support;
and bearing on the bottom side of the support,
  d) an anti-stick layer that reduces the tendency of the thermal adhesion layer to stick to the bottom of the support when stored in contact therewith. Also disclosed is a process for preparing a lenticular element.

18 Claims, 1 Drawing Sheet

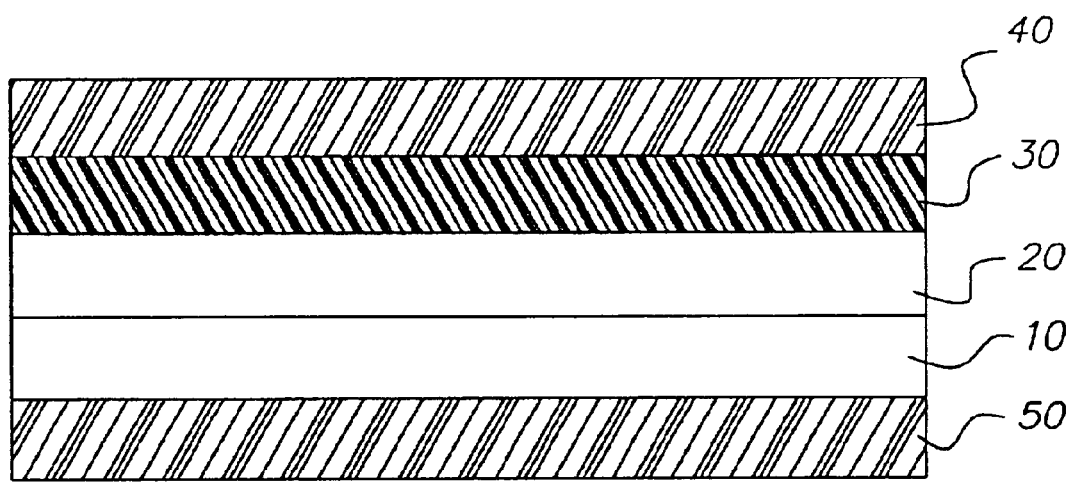

TRANSFER LAMINATE DONOR FOR LENTICULAR IMAGES WITH ANTI-STICK BACKING MATERIAL

FIELD OF THE INVENTION

The present invention relates to a transfer laminate donor bearing an anti-stick backing useful in the forming of a lenticular element.

BACKGROUND OF THE INVENTION

Lenticular arrays or overlays are a known means to give images the appearance of depth or motion. A lenticular image is created using a transparent upper layer having narrow parallel lenticules (half-cylindrical lenses) on the outer surface and an image containing substrate or lower layer that contains images viewable through the lenticules. The two layers form a lenticular system wherein images are selectively visible as a function of the angle from which the system is viewed. A depth image is a composite picture made by bringing together into a single composition a number of different parts of a scene viewed from different angles, as more fully described in U.S. Pat. No. 5,543,964. When the lenticules are vertically oriented, each eye of a viewer will see different elements and the viewer will interpret the net result as depth of field. The viewer may also move his head with respect to the image thereby observing other views with each eye and enhancing the sense of depth. Each lenticule is associated with a plurality of image lines or an image line set and the viewer is supposed to see only one image line (or view slice) of each set with each eye for each lenticule. It is imperative that the line image sets be registered accurately with the lenticules, so that the proper picture is formed when the assembly is viewed.

This process can be used to view multiple images by viewing the lenticular element from different angles. When the lenticules are oriented horizontally, each eye receives the same image. In this case, the multiple images upon moving the lenticular can be used to generate the illusion of motion. For whichever orientation the lenticules are oriented, each of the viewed images is generated by lines from an image which has been interlaced substantially at the frequency of the lenticular array, number of lenticules per length, and with the desired number of images.

One method of recording of linear images on a lenticular recording material is accomplished with a stereoscopic image recording apparatus (hereunder referred to simply as "a recording apparatus") that relies upon optical exposure (printing). With this recording apparatus, original transmission images are projected from a light source. The light transmitted through the original images passes through the projection lenses of the recording apparatus to be focused on the lenticular recording material via a lenticular sheet. The original images are thereby exposed as linear images. Another method of image recording uses scanning exposure, which requires comparatively simple optics and yet has great flexibility in adapting to various image-processing operations and to alterations in the specifications of the lenticular sheet.

In an article entitled "Development of Motion Image Printer", by H. Akahori et al., IS&T 50$^{th}$ Annual Conference Proceedings, page 305, there is a disclosure of a printer for printing stereoscopic images using a thermal head and thermal dye transfer in registration with the lenticular material. The receiver sheet must be heated to achieve the necessary stability for registration of the images with the lenticular material. The resolution is six images on 100 DPI lenticular material with a 300 DPI thermal head. However, there is a problem with this method in that low resolution images are obtained, since heat transferred from the resistive head undesirably "spreads" through the support during printing and the image is therefore lacking in resolution.

EP 0 596 629A2 and EP 0 659 026A2 disclose a method and apparatus for directly printing on lenticular supports using lasers. This method generates an image in contact with the lenticular material. U.S. Pat. No. 6,239,068, concerns a process of forming a diffusion resistant lenticular element. In this process a transfer laminate is used to provide a laminate which does not require trimming and also acts as a receiving/mordanting element for the dyes. This invention works well initially but over time and in the presence of high humidity, the mordanting/adhesion layer can cause blocking wherein the transfer element will, during storage and transport, transfer to the rear of the next winding on the roll, making it unusable. After time, pressure, temperature, and humidity, the adhesive layer will adhere to the obverse side of the transfer laminate donor and peel off the transfer laminate layer when unwound.

It is a problem to be solved to provide a transfer element and process for obtaining a lenticular image using a transfer laminate that has a thermally activated adhesive layer that will not transfer to the rear of the transfer laminate donor during storage or transport.

SUMMARY OF THE INVENTION

The invention provides a multilayer transfer laminate donor comprising a flexible support bearing on the top side of the support:
  a) a release layer capable of allowing the support to be removed from all layers above the release layer;
  b) above the release layer a dye receiving layer;
  c) on top of the transfer laminate donor, a thermal adhesion layer comprising a polymer which has a Tg less than 100° C., and that, upon application of heat, is capable of adhering to a lenticular support;
and bearing on the bottom side of the support,
  d) an anti-stick layer that reduces the tendency of the thermal adhesion layer to stick to the bottom of the support when stored in contact therewith.

The invention also includes a process for forming a lenticular element comprising:
  a) printing an image on a first support which contains a lenticular array;
  b) contacting said image bearing support with the transfer laminate donor above to form a composite;
  c) heating said composite to cause said image to diffuse into said transfer laminate element and to adhere said transfer laminate element to said lenticular element; and
  d) removing the second support from the composite laminate to form a lenticular element.

The invention provides an element and process for obtaining a lenticular image using a transfer laminate that has a thermally activated adhesive layer that will not transfer to the rear of the transfer laminate donor during storage or transport.

BRIEF DESCRIPTION OF THE DRAWINGS

FIG. 1 is a schematic cross sectional view of a multilayer transfer laminate donor of the invention.

DETAILED DESCRIPTION OF THE INVENTION

When making lenticular images by a laser thermal process, the dyes are transferred to a lenticular support in alignment with the lenticules. The dyes predominately are on the surface until they are driven into a dye receiving layer. A transfer laminate is used to provide protection, a dye receiving layer and, at least in a preferred embodiment, will mordant the dyes, without the need for accurate alignment or post trimming of the laminate as described in U.S. Pat. No. 6,239,068. The transfer laminate must have a thermal adhesive, which may also act as the dye-receiving layer. The thermal adhesive must be active at relatively low temperatures less than 100° C. or even less than 80° C. such that deformation of the lenticules does not occur. The transfer laminate donor is usually rolled up or stacked in sheet such that the back of one donor element is in contact with the front adhesive side. Humidity, pressure, temperature, and time can lead to premature adhesion between donor elements rendering the elements useless.

In this invention, a support is coated with a release layer, a dye receiving layer and an adhesive layer. It is understood that a single layer or multiple layers may be used provided the functionality of a release, a dye-receiving, and thermal adhesion is maintained.

The support for the receiving element used in the invention can include polyesters such as poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 5 to about 200 micrometers.

The anti-stick layer of the invention comprises a fluorinated polymer or a trimethylsilyl polymer. Such polymers include a polymer selected from the group consisting of tetrafluoroethylene, chlorotrifluoroethylene, hexafluoropropylene oxide, perfluorovinyl ether, and trifluoroethyl methacrylate polymers and one selected from-trimethylsilylmethacrylate and trimethylsilylmethyl methacrylate polymers or copolymers including one or more of the foregoing. It may be in the form of beads, or other geometric shape or as randomly shredded particles.

As noted above, the adhesive layer 40 of a polymer used in the invention has a Tg less than about 100° C. or even less than 80° C. If the Tg is greater, then the adhesion of the lenticular element to the protective element may be insufficient. Examples of adhesive polymers useful in the invention include condensation polymers such as polyesters, polyurethanes, and polycarbonates; addition polymers such as polystyrenes, and vinyl polymers; and copolymers of more than one type of monomer covalently linked together. In a preferred embodiment of the invention, the adhesive can also act as a mordant for the dyes as detailed in U.S. Pat. No. 6,221,806. Examples of adhesive mordants include acid polymers such as an acrylic polymer, an olefinic polymer, an olefin acrylic copolymer, a sulfopolyester or a styrenic polymer. The adhesive layer can be typically used at a coverage of from about 0.1 to about 10 g/m$^2$.

The release layer used in the invention can be any polymer which will enable the lenticular element to separate from the support of the transfer laminate. The release can occur at the interface of the release layer and the support, within the release layer itself, or at the interface of the release layer and the next adjacent layer. In a preferred embodiment of the invention, the release occurs at the interface of the release layer and the support.

Examples of release layers, which can be used in the invention, include hydroxyethyl cellulose, gelatin, and poly-vinylbutyral. The release layer may be used at a coverage from about 0.1 to about 10 g/m$^2$. In embodiments where the release layer remains with the lenticular element, the release layer can provide additional strength, abrasion resistance, rigidity, ink receptivity for backside printing and prevention of the adhesive layer from sticking to an undesired surface.

Between the release layer and the adhesive polymer, there may be located one or more interlayers to give reflection capability, strength, extra abrasion resistance, or rigidity. These interlayers may comprise a polymeric binder containing reflective materials, such as TiO$_2$, barium sulfate, or hollow beads. In a preferred embodiment of the invention, separation occurs at the interface between the release layer and its support. Thus, the lenticular element will have a reflection layer located between the adhesive polymer and the release layer.

The image layer that is printed on the lenticular array support can be composed of any dye pigment materials provided they generate an image and are compatible with the transfer laminate layer. In a preferred embodiment the dyes are nonionic dyes capable of becoming ionic in the presence of acids and the transfer laminate donor contains and acid mordanting layer.

Any material can be used as the support for the lenticular array of the invention provided it is dimensionally stable. Such materials include polyesters such as poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 50 to about 5000 micrometers. While the lenticular array may be provided on a separate support, generally the support and the array are in one integral element.

During the heating step, the adhesive layer contacts the lenticular element and only adheres in the desired area. Upon separation of the element support from the composite laminate, areas of the element which were not in contact with the lenticular element maintain their integrity. In areas of the mordanting element which was in contact with the lenticular element, separation occurs aided by the release layer and cohesive failure at the edge of the lenticular support thereby obviating the need for a separate trimming step.

Embodiments of the invention enable a high-resolution lenticular image element that is generated efficiently, has a high abrasion resistance, and does not require trimming. The anti-stick backing provides enhanced robustness by allowing the raw stock to not change over time.

The following examples are provided to illustrate the invention.

EXAMPLES

Example 1

Element 1 of the Invention

A 36 micron thick poly(ethylene terephthalate) support was coated with a release layer of polyvinylbutyral, (Butvar™ 76, Monsanto Co.), 1.08 g/m², from acetone. On top of said release layer was coated a mordanting adhesive layer of an aqueous coating of 3.24 g/m² of the ammonia salt of poly{isophthalic acid-co-5-sulfoisophthalic acid (90:10 molar ratio)-diethylene glycol (100 molar ratio)}, MW=20,000 (ammonium salt of AQ29D, Eastman Chemical Co.) and 0.02 g/m² Dispex N-40™, surfactant (Ciba Specialty Chemicals).

Element 2 of the Invention

This element was the same as Element 1 of the Invention except that between the release layer and the mordanting adhesive layer was coated a reflective layer of an aqueous coating of $TiO_2$ (R706, Dupont Inc), 32.4 g/m², and an aqueous coating of 3.24 g/m² of the ammonia salt of poly{isophthalic acid-co-5-sulfoisophthalic acid (90:10 molar ratio)diethylene glycol (100 molar ratio)}, MW=20,000 (ammonium salt of AQ29D, Eastman Chemical Co.) and 0.02 g/m² Dispex N-40™ surfactant (Ciba Specialty Chemicals).

Anti-stick Layer

The backside of Elements 1 and 2 were coated with a copolymer of 2-methyl-2-propenoic acid and ethyl 2-methyl-2-propenoate, 0.32g/m² from water, polytetrafluoroethylene particles (Hydrocerf 9174 from Shamrock Co.) 0.08g/m², polytetrafluoroethylene particles (Fluon® AD1 from Asahi Glass Fluoropolymers USA, Inc.) 0.15g/m², Zonyl FSN surfactant (DuPont Co), 0.02 g/m², and 18 micron beads of a copolymer of styrene and divinylbenzene 95:5, 0.17 g/m². The controls were uncoated element 1 and 2.

Lenticular Array

A polycarbonate lenticular material which consisted of cylindrical lenses on one face and a flat rear face was used. This lenticular material had a pitch of 1.973 lines/mm and a thickness of 1.27 mm. The lens curvature was such that focus was on the rear of the lenticular material.

Printing

A dye-donor element was placed dye side to flat rear side of the lenticular array and vacuum was applied to hold the donor to the array. Printing was accomplished using an SDL 23-S9781 1 watt c-mount laser diode (Spectra Diode Labs, Inc.). Approximately 700 mw was delivered to the element in a spot approximately 13 microns by 80 microns using the technique of beam folding as disclosed by Kessler in U.S. Pat. No. 6,191,802. Scanning of the spot was accomplished using a galvanometer with the beam oriented with the long axis parallel to the scan direction as described by Kessler et. al. U.S. Pat. No. 6,252,621. Dwell time was approximately 9 microseconds. A target image was written onto the back of the donor causing the donor dye to be transferred to the lenticular material. The resulting image was magenta.

Diffusion/mordanting of the dyes and lamination of the transfer laminate of the composite element was accomplished by passing the card through a laminator with the adhesive layer of the element in contact with the flat side of the lenticular array. The lamination was conducted with a feed rate of 0.36 cm/sec at a temperature of 133° C. The laminator was a modified GMP Co. LTD (Kyoungki-Do, Korea) laminator model Passport-175LSI. The modification was to adjust the gap thickness to accommodate the 1.27 millimeter lenticular material and the lower roller heating was disabled. The support was then peeled from the back of the lenticular material to yield a high quality lenticular image card.

The anti-stick back coated support and the control were wound around a 5 cm core and checked periodically, as shown in the table, for evidence of sticking by unwinding the roll.

TABLE I

|   | week # | Peelability | self adhesion |
|---|---|---|---|
| Control | | | |
| 1 and 2 | 2 | Good | None |
|  | 4 | Good | None |
|  | 6 | unusable | yes |
|  | 12 | unusable | yes |
|  | 16 | unusable | yes |
| Element | | | |
| 1 | 2 | Good | None |
|  | 4 | Good | None |
|  | 6 | Good | None |
|  | 12 | Good | None |
|  | 16 | Good | None |
| 2 | 2 | Good | None |
|  | 4 | Good | None |
|  | 6 | Good | None |
|  | 12 | Good | None |
|  | 16 | Good | None |

The above results show that the presence of the anti-stick coating in the elements of the invention tested prevented front to back transfer during storage.

The invention has been described in detail with particular reference to preferred embodiments thereof, but it will be understood that variations and modifications can be effected within the scope of the invention.

Parts List

10 Support
20 Release layer
30 Dye receiving layer
40 Adhesive layer
50 Anti-stick layer

What is claimed is:

1. A multilayer transfer laminate donor comprising a flexible support bearing on the top side of the support:
   a) a release layer capable of allowing the support to be removed from all layers above the release layer;
   b) above the release layer a dye receiving layer including a thermal adhesive comprising a polymer which has a Tg less than 100° C., and that, upon application of heat, is capable of adhering to a lenticular support and functioning as dye receiving layer;
   and bearing on the bottom side of the support,
   c) an anti-stick layer that reduces the tendency of the thermal adhesion layer to stick to the bottom of the support when stored in contact therewith.

2. The element of claim 1 wherein the dye receiving layer mordants the dye.

3. The element of claim 1 wherein the thermal adhesion layer exhibits a Tg less than 100° C.

4. The element of claim 3 wherein the thermal adhesion layer exhibits a Tg less than 80° C.

5. The element of claim 1 wherein the dye receiving layer exhibits a Tg less than 100° C.

6. The element of claim 5 wherein the dye receiving layer exhibits a Tg less than 80° C.

7. The element of claim 1 wherein the dye receiving layer contains a reflective material.

8. The element of claim 1 wherein the reflective material is present as a layer between the release layer and the dye-receiving layer.

9. The element of claim 8 wherein the reflective material includes titanium dioxide particles.

10. The element of claim 1 wherein the support comprises a polyester, polyamide, polycarbonate, cellulose ester, fluorine polymer, polyether, polyacetal, polyolefin, polyimide or copolymer thereof.

11. The element of claim 1 wherein the release layer comprises hydroxyethyl cellulose, gelatin, or polyvinylbutyral.

12. The element of claim 1 wherein the anti-stick layer comprises a fluorinated or trimethylsilyl polymer.

13. The element of claim 12 wherein the anti-stick layer comprises a polymer selected from the group consisting of tetrafluoroethylene, chlorotrifluoroethylene, hexafluoropropylene oxide, perfluorovinyl ether, and trifluoroethyl methacrylate polymers.

14. The element of claim 12 wherein the anti-stick layer comprises a polymer selected from the group consisting of trimethylsilylmethacrylate and trimethylsilylmethyl methacrylate polymers.

15. The element of claim 12 wherein the anti-stick layer comprises a tetrafluoroethylene polymer.

16. A process for forming a lenticular element comprising:

a) printing an image on a first support which contains a lenticular array;

b) contacting said image bearing support with a transfer laminate donor to form a composite, wherein the transfer laminate donor comprises a flexible support bearing on the top side of the support a release layer capable of allowing the support to be removed from all layers above the release layer, above the release layer a dye receiving layer, and a thermal adhesion layer comprising a polymer which has a Tg less than 100° C., and that, upon application of heat, is capable of adhering to a lenticular support; and bearing on the bottom side of the support an anti-stick layer;

c) heating said composite to cause said image to diffuse into said transfer laminate donor and to adhere said transfer laminate donor to said lenticular element; and d) removing the second support from the composite laminate to form a lenticular element.

17. The process of claim 16, wherein the thermal adhesion layer of the transfer laminate donor is the dye receiving layer.

18. The process of claim 16, wherein the thermal adhesion layer of the transfer laminate donor is a separate layer from the dye receiving layer.

* * * * *